United States Patent [19]

Hodén et al.

[11] 4,080,879
[45] Mar. 28, 1978

[54] METHOD OF PRODUCING A CONTAINER AND APPARATUS HEREFOR

[75] Inventors: Ebbe Sigfrid Hodén, Mariefred; Bo Roland Eklånge, Arla, both of Sweden

[73] Assignee: Kooperativa Forbundet (KF) Ekonomisk Forening, Stockholm, Sweden

[21] Appl. No.: 751,744

[22] Filed: Dec. 17, 1976

[30] Foreign Application Priority Data

Dec. 23, 1975 Sweden ............................. 7514609

[51] Int. Cl.² .................................................. B31C 1/02
[52] U.S. Cl. ............................... 93/94 R; 93/44.1 R; 93/81 MT
[58] Field of Search ............. 93/81 R, 81 MT, 94 R, 93/36.1, 39 C, 39.1–39.3, 44, 44.1 R, 54 R, 54.3, 77 R, 94 FC; 53/215

[56] References Cited

U.S. PATENT DOCUMENTS

| | | | |
|---|---|---|---|
| 2,674,557 | 4/1954 | Boggs | 93/94 R X |
| 2,927,624 | 3/1960 | Hughes | 93/81 R X |
| 3,157,096 | 11/1964 | Schmidt | 93/39.3 |
| 3,745,891 | 7/1973 | Bodendoerfer | 93/39 C X |
| 3,958,501 | 5/1976 | Richards | 93/81 MT X |

FOREIGN PATENT DOCUMENTS

| | | | |
|---|---|---|---|
| 633,985 | 2/1928 | France. | |
| 205,673 | 1/1909 | Germany | 93/81 MT |
| 1,082,105 | 5/1960 | Germany. | |
| 1,611,715 | 1/1971 | Germany. | |
| 7,701 of | 1909 | United Kingdom. | |

*Primary Examiner*—James F. Coan
*Attorney, Agent, or Firm*—Fleit & Jacobson

[57] ABSTRACT

There is provided a method and an apparatus for producing a sleeve from a heat-sealable foil blank, wherein the blank is wrapped around a mandrel by means of a strip of flexible material acting on the side of said blank remote from the mandrel. A strip section engaging the blank is held tensioned between two strip-guides which are movable around the mandrel to successively place strip material, and therewith also the foil blank, against the mandrel until the mandrel is surrounded by said blank and two opposite edge portions of the blank overlap each other. The overlapping edge portions of the blank are welded together by heating a portion of said strip material placed on top of said overlapping blank edge portions.

28 Claims, 8 Drawing Figures

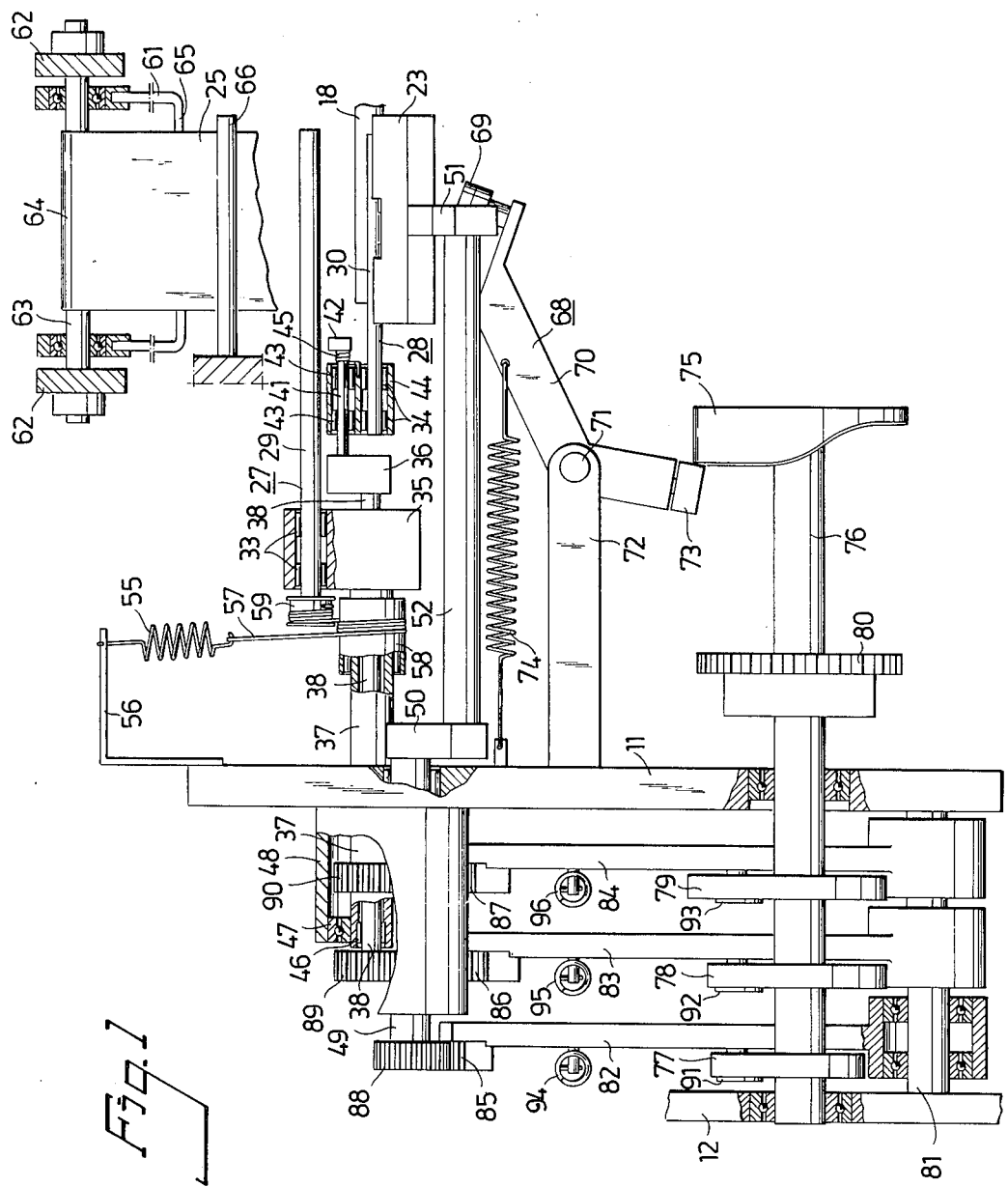

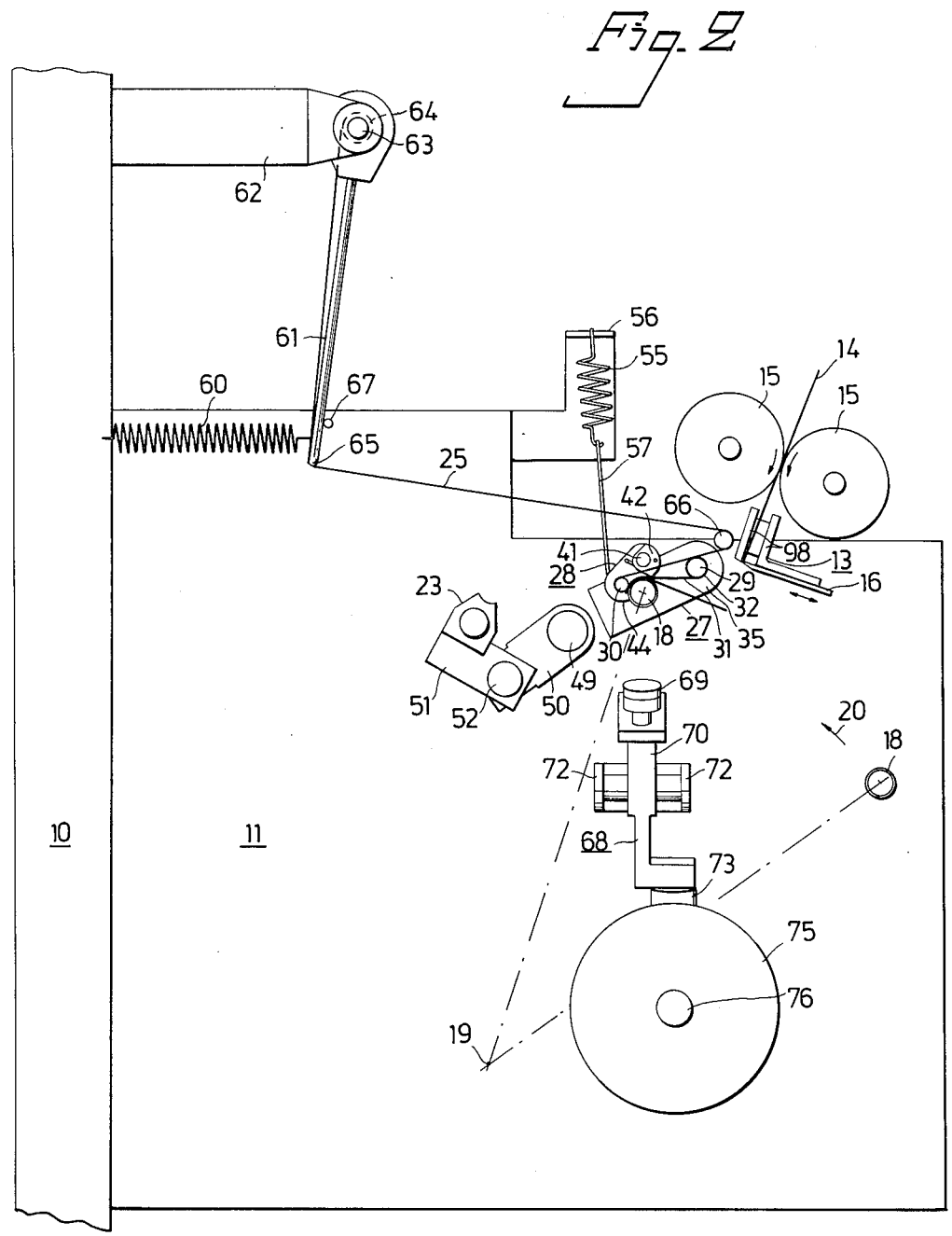

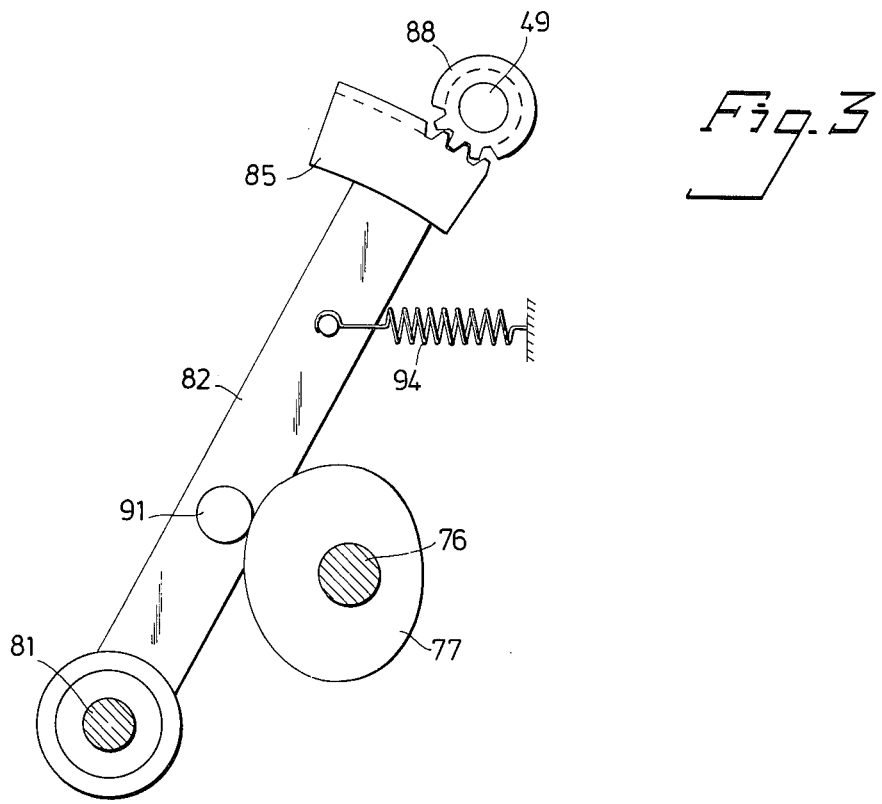
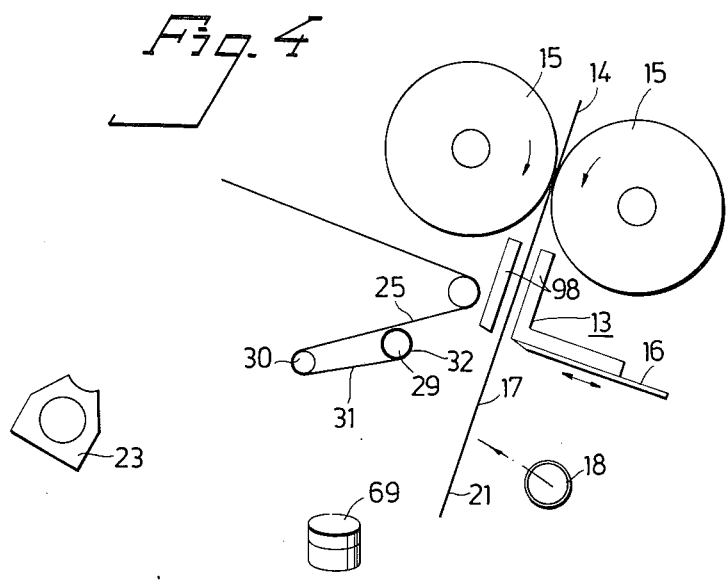

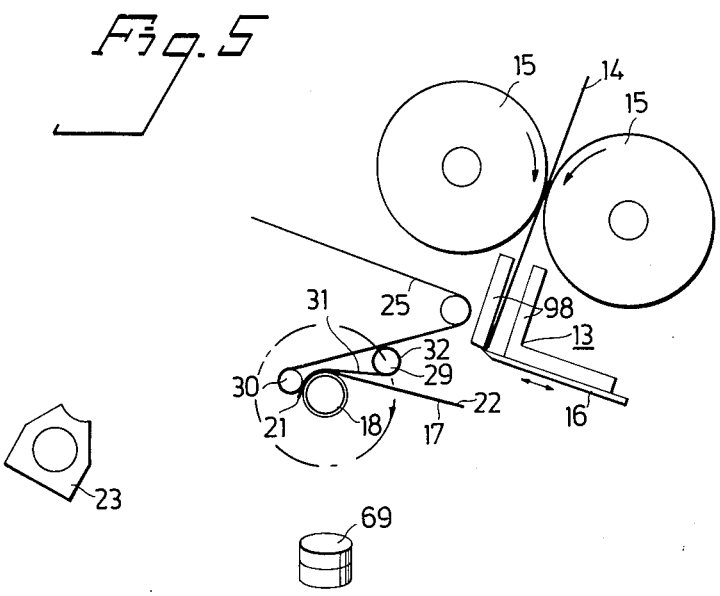
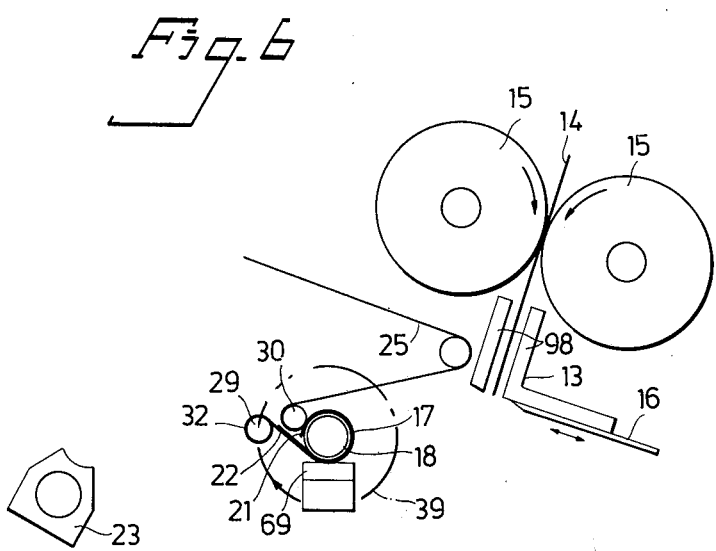

METHOD OF PRODUCING A CONTAINER AND APPARATUS HEREFOR

The present invention relates to a method of manufacturing a sleeve from a heat-sealable foil blank, in which method the foil blank is so wrapped around a mandrel by means of a strip of flexible material acting on the side of said blank remote from the mandrel that portions of the blank are caused to overlap each other, and in which method heat is applied to said portions in the overlapping region thereof to weld the same together. The invention also relates to an apparatus for putting the method into effect.

When packaging products, it is normal to first place a heat-sealable foil blank around a mandrel in a manner such that mutually opposing edge portions of the foil blank overlap each other, whereafter the foil blank is heated to heat-sealing temperatures in the overlapping region. In such a method it is difficult to bring the foil blank into accurate engagement with the external surface of the mandrel around the entire periphery thereof, particularly in the overlapping region when this is left free to enable a heated jaw to be pressed thereagainst in order to heat-seal the blank at said overlapping region. This method results in sleeves whose forms deviate from the form of the mandrel and results in packages of different sizes, which creates a problem when parcelling the packages in, for example, boxes dimensioned to enclose a pre-determined number of packages without any appreciable space between said packages. Further, in the aforedescribed method there is a risk of the foil blank slipping in the peripheral direction of the mandrel when said blank is placed thereon, so that the overlapping region of the blank becomes erroneously positioned relative to the heated jaw, resulting in a faulty sleeve which must be rejected.

An object of the invention is to provide a novel, simple and reliable method and apparatus therefor in which the aforementioned problems are at least substantially eliminated.

To this end there is proposed a method of the type recited in the introduction, and which method in accordance with the invention further comprises the steps of maintaining a section of the strip tensioned between two strip-guides which extend substantially parallel to the mandrel and are moveable therearound; clamping a portion of the foil blank against said strip-section; moving at least one of the strip-guides around the mandrel in a direction away from the clamping point whilst successively placing strip material, and therewith also the foil blank, against the mandrel until the foil blank has been caused to encircle the mandrel around a major portion of its periphery and a first edge portion of said foil blank is caused to lie against the mandrel; moving one strip-guide in a direction to free said first edge portion from the strip-material and moving the other strip-guide in the same direction around the mandrel so that said first edge portion of said foil blank is covered by a second edge portion of said foil blank located opposite said first edge portion and by strip material; and heating the strip portion located on top of said first and said second edge portions so as to apply via said strip portion sufficient heat to said edge portions to weld the same together.

To further ensure that the overlapping region is correctly positioned for heat welding, the contacting portions of the mandrel, the foil blank and the strip may be locked against sliding relative to one another before said one strip-guide is caused to free said first edge portion of the foil blank. Suitably, said first edge portion of the foil blank is clamped against said strip section. The foil blank may to advantage be clamped against a portion of said strip section supported by one of the strip-guides.

In accordance with one embodiment at least one strip guide is caused to move in a path extending parallel with the periphery of the mandrel.

When the foil blank is obtained by cutting an end portion from a foil-material roving and the mandrel is capable of being moved towards a working station in which said foil sleeve is formed around said mandrel, said end portion of the foil-material roving may to advantage be fed in between said working station and the mandrel, whereupon the end-edge portion of the foil-material roving, when the mandrel is moved to said working station, is entrained by the mandrel and is clamped by said mandrel against said strip section.

When the mandrel is arranged on an indexibly advancable wheel, the strip-guides are suitably moved, subsequent to forming the foil sleeve, to portions in which the strip section between said strip-guides is located behind the mandrel.

According to another aspect, this invention consists in an apparatus for carrying into effect the method of producing a sleeve from a heat-sealable foil blank, comprising a mandrel, means for wrapping a heat-sealable foil blank around the mandrel in a manner such that portions of said blank are caused to overlap each other, said wrapping means comprising a strip of flexible material and winding members arranged to press and wind the foil blank around the mandrel via said strip, and means for applying heat to the foil blank around said mandrel within the overlapping region to a heat-welding temperature, wherein said heating means is arranged to heat the foil blank wound around the mandrel within the overlapping region via said strip, and wherein said winding members comprise two strip-guides each of which is at least partially encircled by the strip and each of which extends substantially parallel to and is movable around the mandrel, means being provided for constantly tensioning the section of the strip located between the strip-guides.

Further characterising features of the invention are disclosed in the accompanying claims.

The invention will now be described in more detail with reference to an exemplary embodiment of an apparatus for carrying out the method according to the invention shown in the accompanying drawings, further features of the invention and advantages afforded thereby being made apparent in conjunction therewith.

FIG. 1 is a schematic side view of an apparatus according to the invention, in which Figure certain parts of the apparatus have been omitted and other parts are shown in a broken view, to show the construction of the apparatus more clearly;

FIG. 2 is an end view of the apparatus seen from the right in FIG. 1, certain elements being shown in FIG. 2 in positions which differ from apparent positions in FIG. 1 to facilitate the reading of the Figure;

FIG. 3 shows elements of the apparatus and illustrates the method of controlling the movement of the strip-guides and the heating means;

FIGS. 4 – 8 show very schematically the different steps in the manufacture of a sleeve by the method according to the invention whilst using the apparatus shown in FIGS. 1 – 3.

Figure 7:
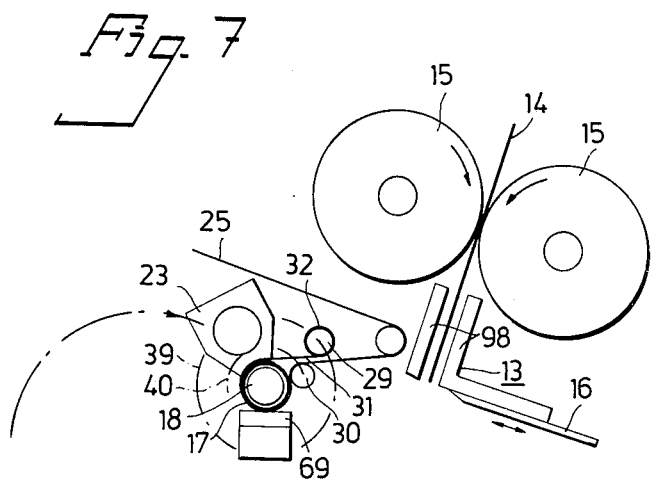

In the drawings, corresponding elements in the different Figures have been identified with the same reference numerals. In the drawings, FIGS. 1 and 2 show an apparatus which is intended to form part of a packaging machine, the other parts of which may be of conventional construction and do not form part of the present invention and hence have been omitted when not required to provide an understanding of the invention. The apparatus comprises frame members 10, 11, 12 of which the frame member 11 has the form of a vertical plate projecting outwardly from the member 10 and supporting a cutting device 13 arranged to clip blanks of heat-sealable foil material from a roving 14 of such material, which material may be in itself totally heat-sealable or may be provided with a layer of heat-sealable material. The foil material is fed step-wise in a known manner by means of feed rollers 15 and is cut into desired lengths by means of a reciprocatingly moveable knife 16. The foil blanks 17 (FIG. 5) cut by the knife 16 each has a length which, when measured in the longitudinal direction of the roving 14, exceeds the peripheral dimensions of a cylindrical mandrel 18, such that two opposing edge portions of the foil blank 17 overlap each other when said blank is wrapped around the mandrel.

As indicated in FIG. 2, a multiplicity of mandrels 18 can be arranged in a manner known per se on an indexibly rotatable wheel, the axis of rotation of which is shown at 19 in FIG. 2, said wheel being rotatable in the direction of arrow 20.

In order to form a sleeve from a foil blank 17, there is provided means for winding the blank around the mandrel in a manner such that the edge portions 21, 22 of the blank overlap each other and means 23 are provided to heat the blank wound around the mandrel in the overlapping region of said blank to a heat-sealing temperature. The winding means comprises a strip 25 of flexible material, comprising, for example, a densely-woven polytetrafluoroethylene, or some other suitable material which is able to withstand the heat-sealing temperature and which does not tend to adhere to the foil blank, and further comprising winding members 27, 28 arranged to press the foil blank 17 against the mandrel and to wind said blank therearound via said strip 25. The heating means is arranged in this way, to heat the blank 17 wound around the mandrel within the overlapping region of said blank via the strip 25.

Each of the winding members 27, 28 comprises a respective strip-guide 29 and 30, the strip-guides extending substantially parallel to the mandrel 18 and arranged to co-operate with means for constantly tensioning the section 31 of the strip 25 located between the strip-guides. One of said strip-guides, 29, comprises a reel which carries a strip-supply 32 in the form of an end portion of strip 25 wound thereupon. The strip-guide 29, having the form of a reel, is rotatably mounted at 33, so that strip material can be wound on and off the same by rotating said reel, this rotation being effected in a manner hereinafter described during movement of the reel around the mandrel 18. The other strip-guide 30 comprises a guide peg partially embraced by the strip 25.

Each of the strip-guides 29, 30 are supported by a respective arm 35 and 36 which, in turn, are arranged on shafts 37, 38 which, in the illustrated embodiment are concentric with one another and with the geometric axis of the mandrel 18 when the mandrel occupies a wrapping station, i.e. is in a position in which the foil blank 17 is wound therearound. Thus, by rotating the shafts 37, 38 the strip-guides 29, 30 can be caused to move around the mandrel 18 in a respective arcuate path as shown in chain lines 39, 40 in FIGS. 6 - 8, the paths 39, 40 being arranged at different distances from the mandrel axis and concentrical therewith. The strip-guide 30 is carried by the arm 36 in a manner such as to resiliently abut the mandrel 18 via the strip portion 31. The strip-guide 30 is carried by the arm 36 via a peg 41 journalled therein, said peg carrying thereon a spring attachment 42 and an arm 44 journalled at 43 on the peg 41 and carrying the bearing 34. Acting between the attachment 42 and the arm 44 is a spring 45 which biases the arm 44 to rotate the arm to a certain extent in a counter clockwise direction as seen in FIG. 2. Thus, as shown at 46, the shaft 38 is mounted on the shaft 37 which, in turn, as shown at 47 is journalled in a casing 48. Mounted in the casing 48 and in the frame member 11 is a further shaft 49 which extends parallel to the shafts 37, 38 alongside the same and which carries the heating device 23 via arms 50, 51 and a rod 52 interconnecting said arms, said device having the form of a heated jaw.

To stretch the strip 25 means are provided which attempt to rotate the strip-guide 29 in a direction in which the strip is wound up thereon. This means comprises a tension spring 55 whose one end is attached to a bracket 56 carried by the frame member 11 and whose other end is connected to one end of a line 57 extending around a roller 58 which is freely rotatably mounted on the shaft 37 said line extending from said roller to and around a further roller 59 fixedly arranged on the strip-guide 29. The other end of the line 57 is fixedly connected to the roller 59 and the line is wound around the rollers 58, 59 in a manner such that, under the influence of the spring 55, the line attempts to rotate the strip-guide 29 anti-clockwise as seen in FIGS. 2 and 4 - 8. In this way a tension force is exerted in one direction on the strip 25. In order to apply a tension force on the strip 25 in the opposite direction to the aforementioned tension force, there is provided a stirrup structure 61 which is biassed by means of a tension spring 60 in a clockwise direction and which is pivotally mounted in a bracket arrangement 62 carried on the frame member 10. The bracket arrangement 62 also carries a shaft 63 which can be locked against rotation and around which there is wound a store 64 of strip material, from which store 64 strip material is normally paid out only when it is desired to change a worn section of strip material in the region where the heat-jaw 23 engages for a fresh strip section. As will readily be understood, said strip section becomes worn as a result of the mechanical and thermal loads to which it is subjected. The strip material 25 passes around the web 65 of the stirrup 61 and also around a stationary guide peg 66 before reaching the strip-guide 30. The force exerted by the tension spring 60 in the strip 25 is smaller than the force exerted by the spring 55 on said strip, and a stop means 67 (FIG. 2) is provided to limit outward pivoting of the stirrup 61.

In order to prevent the strip 25 from sliding relative to the mandrel when the strip-guide is moved clockwise, there is also provided a clamping device 68 arranged to clamp the strip against the mandrel 18. The clamping device comprises a pad 69 carried on one end of a two-arm lever 70, which lever is journalled at 21 in a bracket 72 carried on the frame member 11. The lever 70 carries at its other end a cam-follower roller 73, said roller being held constantly against the curve of a cam wheel 75 by means of a tension spring 74 acting between the lever 70 and the frame member 11. The cam or curve wheel 75 is arranged on a shaft 76 journalled in the frame members 11 and 12.

Arranged on the shaft 76 are a further three curve or cam wheels 77, 78, 79 and a chain wheel 80 which is arranged to be rotated intermittently one revolution at a time by an endless chain (not shown) driven by a drive means therefor (also not shown). Mounted on the frame members 11, 12 is a further shaft 81 on which three arms 82, 83, 84 are pivotally mounted, the respective ends of said arms remote from said shaft 81 carrying arcuate racks 85, 86, 87 whose respective centres of curvature lie in the geometric axis of the shaft 81. Each of the racks 85, 86, 87 engages a respective one of three gear wheels 88, 89 and 90, each of said wheels being mounted to a respective one of the shaft 49, 38 and 37. The casing 48 is therewith provided with openings to permit engagement of the racks 86, 87 with the wheels 89, 80. The arms 82, 83, 84 carry between their ends cam followers 91, 92, 93, each of which is held pressed against a respective one of the cam wheels 77, 78, 79 by means of respective tension springs 94, 95, 96 acting between the arms and a frame member not shown. The arrangement of the arm 82 as seen from the left in FIG. 1 is shown in FIG. 3. It will be understood that the arms 83 and 84 are arranged in a corresponding manner. As will best be seen from FIG. 4, the foil blank 17 is inserted between the mandrel 18 and the section 31 of the strip extended between the strip guides 29, 30, by means of the feed rollers 15 and guides 98. By rotating the indexing wheel (not shown) the mandrel 18 is adjusted relative to the strip-section 31 in a manner such that the edge portion 21 is carried by the mandrel and clamped thereby against said strip section 31, more specifically against a portion of the strip section supported by the strip-guide 30. In this position (FIG. 5) the mandrel is located in a working station, wherein the foil blank is formed into a sleeve having mutually overlapping edge portions 21, 22, which are joined by heat welding the same.

The elements 76–96 are so constructed as to form control means which, from the position shown in FIG. 5 in which one edge portion 21 of the foil blank is clamped fast between the mandrel 18 and the strip section 31, moves the strip-guide 29 clockwise around the mandrel in a direction away from the point at which the edge portion 21 is clamped whilst successively placing strip material, and therewith also the foil material of the blank around the mandrel until the foil blank 17, as shown in FIG. 6, encircles the mandrel around the major portion of its circumference, and then moves the strip-guide 30 clockwise to release the edge portion 21 from said strip material, and moves the strip-guide 29 also clockwise around the mandrel 18 so that the edge portion 21 of the foil blank 17 will be covered by the other edge portion 22 of said foil blank and by said strip material, as shown in FIG. 7, and thereupon moves the heating device 23, which is heated electrically in a known manner to the strip 25 in the region thereof at which the edge portions 21, 22 overlap each other, so as to heat the strip 25, as is also shown in FIG. 7, so that the heat required to heat-weld said edge portion is applied thereto within the overlapping area.

The elements 71-76 are so constructed as to form control means for movement of the clamping device 68 to its clamping position before the strip-guide 30 is caused to release the edge portion 21, as shown in FIG. 6.

Figure 8:
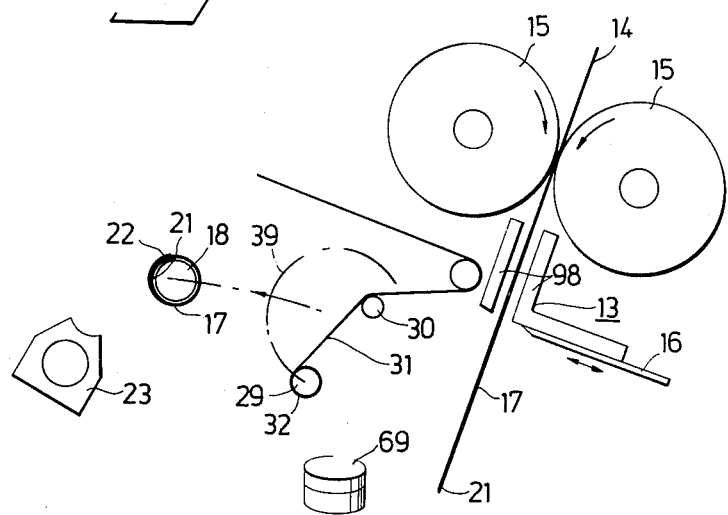

When the mandrel 18 is to be moved beyond its working station, subsequent to forming the sleeve, i.e. beyond the station in which the mandrel is located in the position shown in FIGS. 5 - 7, this being the case when using an indexibly rotatable wheel, the cam wheels 92, 93 are constructed in a manner such that the strip-guides, as shown in FIG. 8, subsequent to forming the sleeve are moved to positions in which the strip-section 31 located therebetween is positioned behind the mandrel 18 as seen in the direction of movement of the mandrel.

When the strip-guide 29 moves in a clockwise direction, as seen in FIGS. 2 and 4 - 8, strip material is unreeled therefrom against the action of the spring 55. When the strip-guide 30 rotates clockwise, as seen in FIGS. 2 and 4 - 8, the strip 25 is held tensioned via the spring 60.

The manner in which the sleeve is treated subsequent to being formed, and the manner in which the sleeve is filled and the ends thereof sealed, do not form part of the present invention and will not be described here. Neither is the manner in which the sleeve is removed from the mandrel 18 part of the invention and will likewise not be described.

The invention is not restricted to the described and illustrated method and apparatus. Thus, the mandrel may be of nonround cross-section and it may be moved towards and away from the said working station in a manner other than that described and illustrated. Further, different means than those shown and described may be used for controlling the movements of the strip-guides, the heating means and the clamping means, and sheet-like foil blanks may be used instead of cutting the blanks from a continuous supply, in which case the device 16 is omitted. A central portion of the foil blank may be first clamped to the said strip-section, although in this case the strip-guide 30 should be moved to a position in which the edge portion 21 is placed against the mandrel 18 before said edge portion is covered by the other edge portion 22. Additionally, both strip-guides may lack a strip supply 32 or may carry such a supply. These alternatives are only examples of the many modifications which can be made within the scope of the accompanying claims.

I claim:

1. A method of producing a sleeve from a heat-sealable foil blank, in which method the blank is so wrapped around a mandrel by means of a strip of flexible material acting on the side of said blank remote from the mandrel, that portions of said blank are caused to overlap each other, and in which method heat is applied to said portions in the overlapping region thereof to weld the same together, the improvement comprising the steps of maintaining a section of the strip tensioned between two strip-guides which extend substantially parallel to the mandrel and are moveable therearound; clamping a portion of the foil blank against said strip-section; moving at least one of the strip-guides around the mandrel in a direction away from the clamping point whilst successively placing strip material, and therewith also the foil blank, against the mandrel until the foil blank has been caused to encircle the mandrel around a major portion of its periphery and a first edge portion of said foil blank is caused to lie against the mandrel; moving one strip-guide in a direction to free said first edge portion from the strip-material and moving the other strip-guide in the same direction around the mandrel so that said first edge portion of said foil blank is covered by a second edge portion of said foil blank located opposite said first edge portion and by strip material; and heating the strip portion located on top of said first and said second edge portions so as to apply via said strip portion sufficient heat to said edge portions to weld the same together.

2. A method according to claim 1, wherein the mutually contacting portions of the mandrel, the foil blank and the strip are locked against sliding relative to one another before said one strip-guide is caused to free said first edge portion of the foil blank.

3. A method according to claim 1, wherein said first edge portion of the foil blank is clamped against said strip section.

4. A method according to claim 1, wherein the foil blank is clamped against a portion of said strip section supported by one of the strip-guides.

5. A method according to claim 1, wherein at least one strip-guide is caused to move in a path extending parallel with the periphery of the mandrel.

6. A method according to claim 1, wherein the foil blank is obtained by cutting an end portion from a foil-material roving, and in which the mandrel is movable towards a working station in which said foil sleeve is formed around said mandrel, further including the steps of feeding said end portion of the foil-material roving between said working station and the mandrel, and moving the mandrel to said working station, the end-edge portion of the foil-material roving being engaged by the mandrel and clamped by said mandrel against said strip section.

7. A method according to claim 6, wherein the mandrel is arranged on an indexibly advanceable wheel, and further including the step of moving the strip guides subsequent to the forming of the foil sleeve, to positions in which the strip section between said strip-guides is located behind the mandrel.

8. An apparatus for producing a sleeve from a heat-sealable foil blank, comprising a mandrel, means for wrapping a heat-sealable foil blank around the mandrel in a manner such that portions of said blank are caused to overlap each other, said wrapping means comprising a strip of flexible material and winding members arranged to press and wind the foil blank around the mandrel via said strip, and means for applying heat to the foil blank around said mandrel within the overlapping region to a heat-welding temperature, wherein said heating means is arranged to heat the foil blank wound around the mandrel within the overlapping region via said strip, and wherein said winding members comprise two strip-guides each of which is at least partially encircled by the strip and each of which extends substantially parallel to and is moveable around the mandrel, and said means for wrapping includes means for constantly tensioning the section of the strip located between the strip-guides.

9. An apparatus according to claim 8, wherein at least one strip-guide comprises a reel which carries a strip-supply in the form of an end portion of the strip wound thereupon, the arrangement being such that strip material can be unwound from and wound onto the reel whilst said reel is moving around the mandrel.

10. An apparatus according to claim 9, comprising spring means for exerting a tension force on the storage reel in a direction in which strip material is wound onto the reel.

11. An apparatus according to claim 10, wherein one strip-guide comprises a guide peg which is only partially encircled by the strip, and including means for exerting a tension force on the part of the strip remote from the guide peg, said tension force being smaller than the tension force exerted on the strip in the opposite direction by said spring means, and means for limiting movement of the strip in a direction towards said reel.

12. An apparatus according to claim 11, wherein the guide peg is rotatably mounted.

13. An apparatus according to claim 8, including clamping means for clamping the strip against the mandrel.

14. An apparatus according to claim 8, wherein the strip-guides are moveable in respective paths which are concentrical with the geometric axis of the mandrel.

15. An apparatus according to claim 8, wherein the strip-guides are arranged for movement around the mandrel in paths located at different distances from the geometric axis of the mandrel.

16. An apparatus according to claim 8, wherein at least one strip-guide lies resiliently, via the strip and the foil blank, against the outer surface of the mandrel during movement of said strip-guide around said mandrel.

17. An apparatus according to claim 8, further comprising means for inserting a foil blank between the mandrel and the strip-section extending between the strip-guides, and means for adjusting the mandrel and said strip-section relative to each other in a manner such that a portion of the foil blank is clamped between the mandrel and said strip-section.

18. An apparatus according to claim 17, in which the foil blank is obtained by cutting an end portion from a foil-material roving and the mandrel is movable to a working station in which a foil sleeve is formed around the mandrel, the apparatus further comprising means for feeding said end portion of the foil-material roving between said working station and said mandrel, and means for moving the mandrel such that said mandrel engages the end portion of said foil-material roving and clamps it against said strip-section.

19. An apparatus according to claim 17, further comprising control means for moving at least one of the strip-guides from a position in which part of the foil blank is clamped fast between the mandrel and said strip section around the mandrel in a direction away from the clamping position and for simultaneously placing strip material, and therewith also the foil blank, against the mandrel until the foil blank has been caused to encircle the mandrel around a major part of its periphery and with a first edge portion of said blank lying against the mandrel, said one strip-guide being movable by said control means in a direction to release said first edge portion from said strip material, the other strip-guide being movable by said control means in the same direction around the mandrel so that said first edge portion of said foil blank is covered by a second edge portion of said foil blank opposite to said first edge portion and by strip material, said heating means being movable by said control means to said strip in the region in which said edge portions overlap each other to heat the strip so that said strip transmits to the edge portions within the overlapping region sufficient heat to heat-weld said edge portions.

20. An apparatus according to claim 19, in which the mandrel is arranged on an indexibly rotatable wheel, wherein said strip-guides are movable by said control means subsequent to forming a foil sleeve to positions in which the strip section between said strip-guides is located behind the mandrel.

21. An apparatus according to claim 19, further including clamping means for clamping the strip against the mandrel and wherein the control means includes means for moving said clamping means to a clamping position before said one strip-guide is caused to release said first edge portion of the foil blank.

22. An apparatus according to claim 8, further including arms for supporting each strip-guide and rotatable shafts for carrying respective arms.

23. An apparatus according to claim 22, further comprising arm means for carrying said heating means and a rotatable shaft for carrying said arm means.

24. An apparatus according to claim 22, wherein said shafts extend parallel to one another.

25. An apparatus according to claim 24, wherein said shafts are concentric with one another.

26. An apparatus according to claim 21, wherein the control means further comprises cam wheels arranged to co-operate with respective ones of cam followers associated with the strip-guides, the heating means, and the clamping means.

27. An apparatus according to claim 26, further including a shaft for supporting the cam wheels.

28. An apparatus according to claim 26, further including shafts for supporting said strip-guides and said heating means, a gear wheel fixedly connected to each of said shafts, an arcuate rack engaged by each of said gear wheels, a pivotally mounted arm for supporting each of said racks, and a cam follower supported on each of said arms between its pivot and supported rack in contact with one of said cam wheels.

* * * * *